July 1, 1958 R. ABRAMS 2,841,261

TOOL COUPLING

Filed April 26, 1954

Inventor
Ralph Abrams
by Roberts, Cushman & Grover
Att'ys 2,841,261

TOOL COUPLING

Ralph Abrams, Sharon, Mass.

Application April 26, 1954, Serial No. 425,690

3 Claims. (Cl. 192—66)

This invention relates to a device for mounting a rotary tool on a driving shaft through the intermediary of a coupling which transmits the driving torque only if a certain axial force is exerted, and which transmits only torques below a predetermined value.

Various devices of this general type have heretofore been proposed but these are not only comparatively complicated, cumbersome in assembly and disassembly and therefore maintenance, and comparatively expensive, heavy and of unsuitably large dimensions, all of which renders their use, especially in the home shop, not as frequent or easy as should be expected.

It is one of the objects of the present invention to provide a device of this type which is of extreme simplicity but nevertheless precise and fully reliable as to the above indicated functions, which is inexpensive, which can be attached to any conventional driving shaft or similar device and to any tool such as screwdrivers, bits, drills and reamers, and which is so small and light that attachment thereof to a customary driving device such as an electric drill, hardly affects the handling and working characteristics of driving means and tool.

Devices according to the invention comprise a driving member and a driven member, one of these members (for example the driving member) having a conical body with holding or tool attaching means for example a shaft adapted for insertion into the chuck of a driving tool at its base or larger end and an axial recess at its top or narrower end, and having a frictional peripheral surface, preferably provided by a body of friction promoting material on a core of this member; the other member (for example the driven member) has a hollow body or shell which fits the conical body of the other member, and holding or tool attaching means, for example a recess for pressurably receiving a tool shank, or a chuck for receiving a tool such as a screwdriver or drill. The device further comprises a spring inserted in the above-mentioned axial recess of the conical body, which spring bears on the inside of the hollow body or shell at its narrower end and which spring tends to separate the two members. The device finally comprises retaining means at the wider ends of the members, for preventing separation thereof while permitting slight axial movement therebetween, which retaining means may consist for example of a retaining spring which rests in a recess of the hollow member and forms a ridge extending inwardly over the inner member.

These and other objects and features of novelty will appear from the following description of a typical embodiment and its operation illustrating the novel characteristics of the invention. These refer to a drawing in which Fig. 1 is a side elevation of a device according to the invention;

Figures 1, 2, 3, 4, 5:
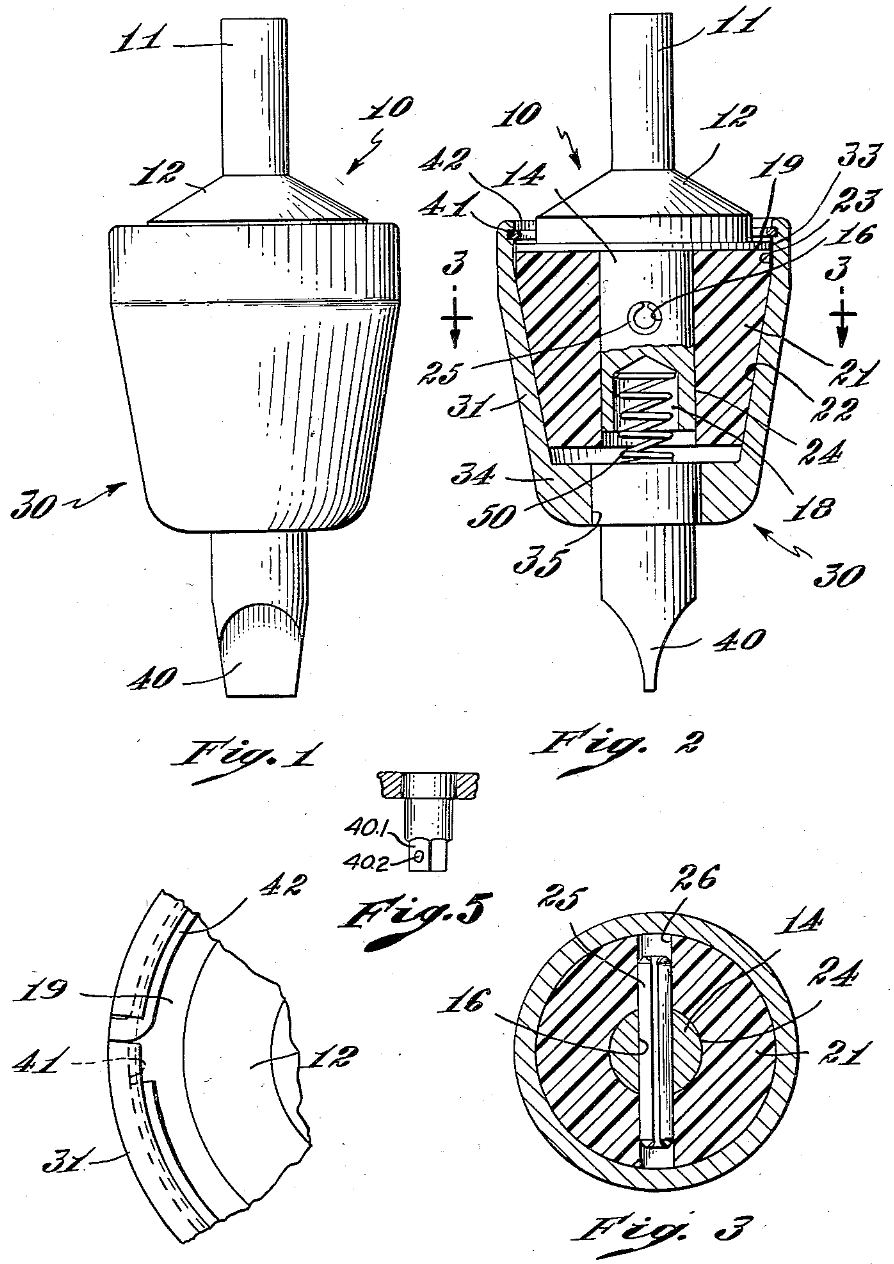
Fig. 2 is an axial cross-section of the device, with the tool, carried by the driven member, in elevation and the core of the driving member in elevation but partly broken away.
Fig. 3 is a section on lines 3—3 of Fig. 2.
Fig. 4 is a detail top elevation showing the manner in which the retaining spring is attached to the driven member.
Fig. 5 shows a modification of the tool mount shown in Fig. 2.

In the practical embodiment herein described, the driving member 10 is shown as having a shank 11 preferably of dimensions adapting it for insertion into the chuck or other holding device of a driving tool or mechanism such as an electric drill of the hand or drill press type. It will be understood that shank 11 can be replaced by means of similar function. Preferably integral with the shank 11 are a flange 12, washer 19 and a core 14. In order to provide a smooth exterior contour of the device as a whole, the flange 12 is preferably conical as indicated in Figs. 1 and 2. The core 14 has a transverse hole 16 (Figs. 2 and 3) for a conventional expansion spring pin commonly referred to as roll pin, to be described below. As shown in Fig. 2, the core has an axial recess 18 adapted to receive the spring likewise to be described hereinbelow.

Mounted on core 14 and separated from flange 12 by washer 19 is a friction body or cone 21 whose outer conical surface 22 fits the inner surface of the second body or shell 30 to be described below. The friction cone 21 is in the present embodiment made of conventional brake lining material composed of asbestos, rubber and brass wire, but it should be understood that any suitable material of similar properties can be used. Although a special friction material is preferred, the cone can be made of cast iron for example, or in one piece with core 14, washer 19 and flange 12, if suitable frictional properties are imparted to its surface. The upper portion of the friction body is cylindrical as indicated at 23, in order to permit easy axial movement, limited by the retaining spring described below. The friction body has an axial hole 24 which fits the core 14, so that the core 14 can be inserted into the friction body 21.

The friction body 21 is secured to the core 14 by means of the above-mentioned roll pin 25, as shown in Figs. 2 and 3 which pin is driven through a hole 26 of the friction body 21 and the above described hole 16 of the core 14.

The second member, in this example the driven member 30, has a hollow body or shell 31 whose inner surface is formed to fit the friction body 21 but has a short cylindrical portion 33 at its upper end, corresponding to the cylindrical portion 23 of the friction body 21. The lower, narrower bottom portion 34 of the shell has a cylindrical bore 35 which can serve to receive the shank of a chuck for holding a tool or, as here shown, can be used directly to mount by way of pressure fit a tool such as a screwdriver 40. Instead of a tool, a square male member 40.1 can be mounted in bore 35, which member can contain a spring loaded steel ball 40.2 for holding socket attachments, as shown in Fig. 5.

As shown in Figs. 2 and 4, the outer body or shell 31 has on its upper inside a recess 41 for receiving a retaining spring 42 which extends beyond the cylindrical surface 33 of the shell and inside of the periphery of the washer 19 which is flush with the cylindrical portion 23 of the friction body 21. In this manner, disassembly of the two members is prevented while they are permitted to separate somewhat by axial movement, within the limits defined by the upper surface of the washer 19 and the lower peripheral portion of the retaining ring 42, when cone 21 and shell 31 are engaged. Some misalignment is permitted by this construction, whereas gross misalignment is prevented.

As mentioned above a spring 50 is inserted in the axial recess 18 of core 14 and rests on one side of the bottom of that recess and on the other side on the bottom 34 of shell 31, in the present instance against the pressurably attached shank of the screwdriver 40. The spring 50 is so dimensioned that it will normally press the washer 19 against the spring ring 42, thus permitting relative movement between the friction body 21 and the shell 31. Figs. 2 and 3 show the device in driving condition, with spring 50 compressed and washer 19 separated from ring 42.

The above-described device operates as follows.

In inoperative condition, the spring 50 separates the two members, with the washer 19 of the friction body 21 resting against the retaining spring 41 of the shell 31. Upon engagement of a tool and axial pressure exerted towards the tool at the holding member such as shank 11, the friction body 21 is pressed against the inner surface of shell 31, the two surfaces engage and a torque is transmitted. If the torque exceeds a certain limit greater than the frictional torque, the tool members begin to slip relatively to each other.

It should be understood that the present disclosure is for the purpose of illustration only and that this invention includes all modifications and equivalents which fall within the scope of the appended claims.

I claim:

1. A tool coupling comprising: a driving member; a driven member; one of said members having a metal core with tool attaching means at one end and an axial recess at its other end, washer means attached to said core against axial movement on the core towards the tool attaching means, on said core a frusto-conical body of friction material with the top of said body at the recessed end of the core and its base at the washer means, and aligned perforations through said core and said frusto-conical body, and the other member having a hollow body fitting said frusto-conical body, with a tool mounting means at its narrower end opposite said recessed end of said core; a spring inserted in said axial recess, bearing on the inside of said hollow body and tending to separate said members; a fastening pin through aligned perforations of said core and said frusto-conical body; and removable retaining means at the wider end of said hollow body, said retaining means extending inwardly over said washer means such as to prevent disassembly and gross misalignment while permitting slight axial movement of said members.

2. A tool coupling comprising: a driving member; a driven member; one of said members having a flange, on one side of the flange a core and on the core a metallic washer that is somewhat wider than said flange, and on the other side of the flange tool attaching means, and a conical friction body resting on said core and said washer, the other member having a hollow body fitting said conical body, being open at the wider end and having tool attaching means at the narrower end, and the wider end of said hollow body extending beyond said washer and having an internal groove at said extending end; a spring inserted between said core and said narrower end of said hollow body, said spring tending to separate said members; and a spring ring in said internal groove, extending inwardly over said washer for retaining the driving and driven members assembled and for preventing disassembly and gross misalignment while permitting slight axial movement thereof.

3. A tool coupling comprising: a driving member including a cylindrical metal core with tool attaching means at one end, an axial recess at its other end, and a flange member therebetween; on said recessed side of said core a frusto-conical body of friction material having a cylindrical bore fitting said core and a base, with the top of said body reaching beyond the recessed end of the core; a washer between said flange member and said frusto-conical body, said base of said body of friction material fitting said washer; a driven member including a hollow body fitting said frusto-conical body, with an open wider end and a base with tool attaching means opposite said recessed end of said core, said hollow body extending beyond said washer and having on the inside of its extending wider end, on the outer side of said washer, an annular groove; a spring inserted in said axial recess of said core, bearing on the inside of said base of the driven member and tending to separate said members; a fastening pin through said core and said frusto-conical body; and in said groove a retaining ring extending inwardly over said washer for preventing disassembly and gross misalignment while permitting slight axial movement of said members.

References Cited in the file of this patent

UNITED STATES PATENTS

| | | |
|---|---|---|
| 917,087 | Lovenich | Apr. 6, 1909 |
| 1,024,151 | Smith | Apr. 23, 1912 |
| 1,196,839 | Bodene | Sept. 5, 1916 |
| 1,447,626 | Partlow | Mar. 6, 1923 |
| 1,777,829 | Edgecumbe | Oct. 7, 1930 |
| 2,045,452 | Emrick | June 23, 1936 |
| 2,161,300 | Kolstad | June 6, 1939 |
| 2,613,780 | Larson | Oct. 14, 1952 |
| 2,753,031 | Light | July 3, 1956 |
| 2,756,854 | Brenholts | July 31, 1956 |